(12) United States Patent
Miyagawa

(10) Patent No.: US 6,507,458 B1
(45) Date of Patent: Jan. 14, 2003

(54) HEAD SLIDER AND DISK APPARATUS

(75) Inventor: Kensuke Miyagawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,126

(22) Filed: Mar. 29, 2000

(30) Foreign Application Priority Data

Jul. 15, 1999 (JP) .......................................... 11-201194

(51) Int. Cl.⁷ ................................................ G11B 5/60
(52) U.S. Cl. .................................... 360/237; 360/236.6
(58) Field of Search .............................. 360/237, 236.3, 360/236.6, 235.8

(56) References Cited

U.S. PATENT DOCUMENTS 6,229,671 B1 * 5/2001 Boutaghou et al. ...... 360/235.1
6,252,742 B1 * 6/2001 Kameyama ................. 360/237

* cited by examiner

*Primary Examiner*—Robert S. Tupper
(74) *Attorney, Agent, or Firm*—Greer, Burns & Crain, LTD

(57) ABSTRACT

A head slider has a chamfered pad between the side edge and rail at the surface opposing the disk. The pad prevents contact between the edge of the basic material of the head slider and the disk. Contact between the pad and disk can be generated, but since the pad is chamfered, the disk is not as easily damaged. In comparison with chamfering the basic material and rail, the present invention has less influence on the floating characteristics of the slider, so the amount of chamfering can be increased. Therefore, damage to the disk can be alleviated remarkably and shock resistance of disk apparatus can be much improved.

19 Claims, 11 Drawing Sheets

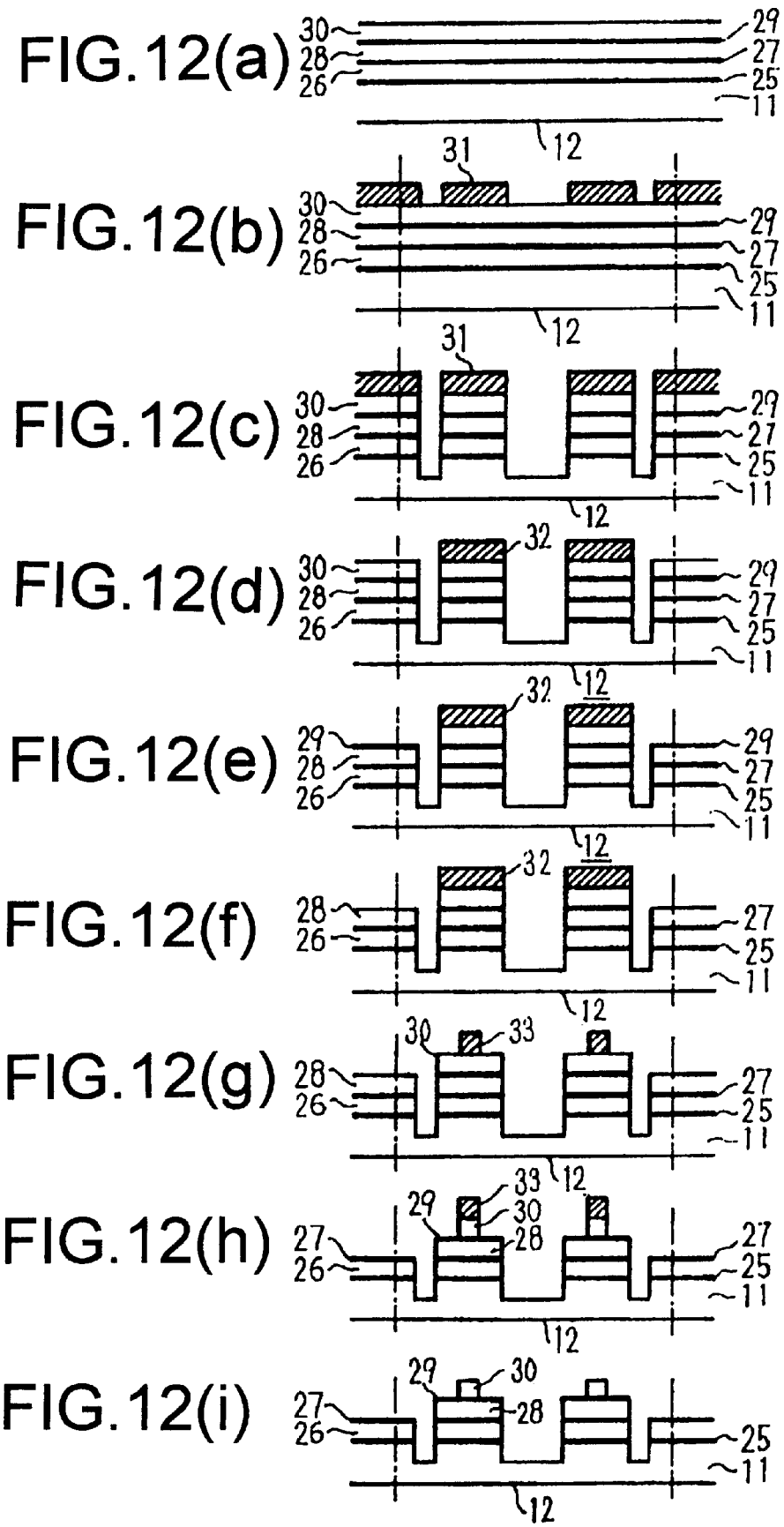

HEAD SLIDER AND DISK APPARATUS

The present invention relates to a structure of a head for writing or reading data to or from a disk medium, and more particularly, to a structure of a floating type head for stopping in contact on the disk medium during the non-operating condition and recording or reading data to or from the disk medium while it is floating thereon during the recording/reproducing operation.

BACKGROUND OF THE INVENTION

In disk apparatus for recording or reproducing information to or from a disk medium, a contact●start●stop system (CSS system) is often employed, in which the head slider is in contact with the disk surface during the non-operating condition, and floats over the surface of the disk when it rotates during the recording and reproducing operation, in order to avoid wear due to contact between the head slider on which a head element is loaded and the disk surface.

FIG. 1 shows a head slider of the related art. FIG. 1(a) is a plan view of the surface of the head slider opposing the disk, and FIG. 1(b) shows an end surface of the air outgoing side of the head slider.

At a surface 1a opposing a disk 50, a couple of projected stripe type rails 3 are formed in basic material 11 of a head slider 90. At an air bearing surface 3a of the rail 3, an adsorption preventing pad 5 is formed to prevent adsorption or touching of the air bearing surface 3a of rail 3 to the surface of disk 50. At the air incoming end side of the air bearing surface 3a, a tapered portion 6 is formed to easily generate a floating force for the head slider 90. At the end surface of the air outgoing side of the head slider 90, an electromagnetic transducer 2 such as an inductive head, magneto-resistive element and/or spin bulb magneto-resistive element is formed.

In disk devices using a CSS system, the head slider 90 is supported by a suspension (not illustrated) having a spring. When the disk 50 is rotating, the head slider 90 floats by receiving the air flow generated by rotation of the disk 50 at its disk confronting surface, and is in contact with the CSS zone 50a of the disk 50 (FIG. 1(b)) when the disk 50 is not rotated. During the reading or writing operation, the head slider 90 moves across the surface of the rotating magnetic disk 50 while it is floating therefrom, and the head element 2 mounted to the head slider 90 reads and writes information from and to the predetermined tracks of the disk 50.

In recent years, with further reduction in the size of magnetic disk devices, such disk devices have been introduced into portable apparatus such as a note-size personal computer as memory. However, the magnetic disk devices are exposed to external shock. Therefore, high durability and shock resistance are required for such magnetic disk apparatus.

In magnetic disk devices using the CSS system, the head slider is in contact with the CSS zone at the surface of the magnetic disk while the disk is not rotated. In this condition, when the magnetic disk apparatus receives shock during transportation or by dropping, the head slider is tilted and an edge 7 of the basic material 111 illustrated in FIG. 1(a) slides on the surface of the magnetic disk 50. The edge of the head slider is hard and sharp. Therefore, when the edge 7 slides on the surface of the magnetic disk 50, the disk 50 can become damaged, generating the phenomenon that data is destroyed or data reading or writing is disabled. Thereby, shock resistance of the magnetic disk apparatus is lowered. As a structure for alleviating wear of the magnetic disk and head slider, the edge of the basic material of the head slider could be chamfered. However, this method is not so effective because the amount of chamfering cannot be increased. Moreover, the width of the floating rail up to the side edge of the head slider could be widened in order to chamfer the edge of the rail, but when the width of the floating rail is widened, the floating characteristic changes and the desired floating height cannot be attained.

OBJECTS OF THE INVENTION

Accordingly, one object of the present invention is to enhance the shock resistance of magnetic disk devices.

Another object of the present invention is to provide a head slider which can alleviate wear caused by the disk.

Moreover, a further object of the present invention is to provide a head slider which has good floating characteristics.

SUMMARY OF THE INVENTION

The head slider of the present invention has a chamfered pad between the side edge and rail at the surface opposing the disk. In this manner, the pad avoids contact between the edge of the basic material of the head slider and the disk. Contact between the pad and disk can occur, but since the pad is chamfered, the disk is not easily damaged. In comparison with chamfering the basic material and rail, the present invention has less influence on the floating characteristics of the slider, so the amount of chamfering can be increased. Therefore, damage to the disk can be alleviated remarkably and shock resistance of disk apparatus can be much improved.

Moreover, the head slider of the present invention can have a pad formed with a height lower than the height of the slider rail at the side edge at the surface opposing the disk. According to this structure, not only the contact between the edge of the basic material of the head slider and the disk medium can be avoided, but also the pad does not regulate the floating height of the head slider. In this manner, the shock resistance of disk apparatus can be improved, without increasing the floating height of the head slider and thereby high recording density of the disk apparatus can be realized.

Here, it is desirable that the hardness of the pad be lower than the hardness of the basic material. According to this structure, contact between the pad and disk medium is generated but since hardness of the pad is lowered, the disk is not damaged as easily. Therefore, damage to the disk is alleviated and shock resistance can further be improved.

Moreover, the height of the pad can be made equal to the height of the slider rail, and the pad and slider rail can be formed of the same material. According to this structure, the pad and slider rail can be formed by the same process. Accordingly, manufacturing cost can be reduced through reduction of manufacturing processes.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIGS. 12(a)–12(i) show steps in the manufacturing process of the head slider of the three-stage structure.

DETAILED DESCRIPTION OF THE INVENTION

Figure 1A:
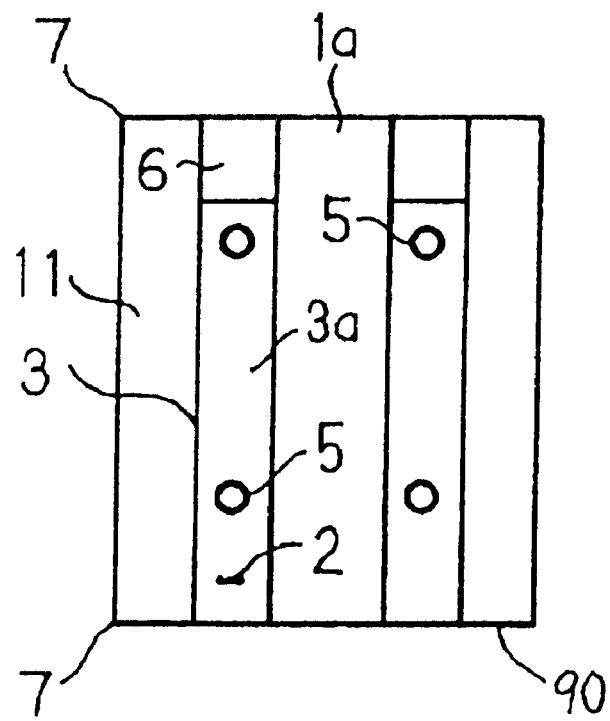
FIG. 1(a) is a plan view of a conventional head slider.
Figure 1B:
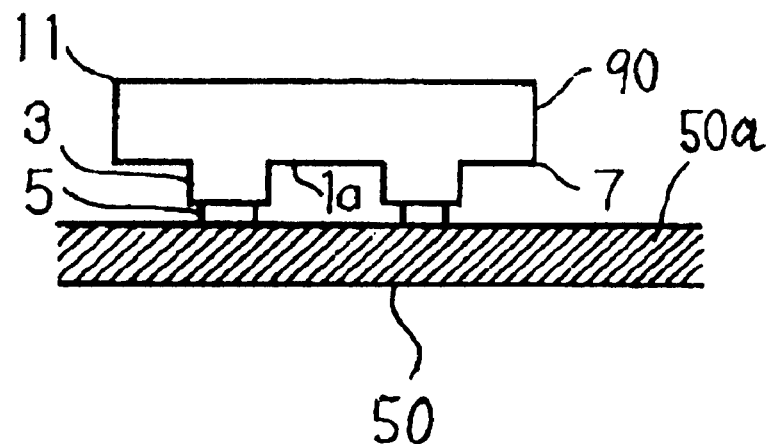
FIG. 1(b) shows an end surface of the air outgoing side of the conventional head slider of FIG. 1(a)
Figure 2:
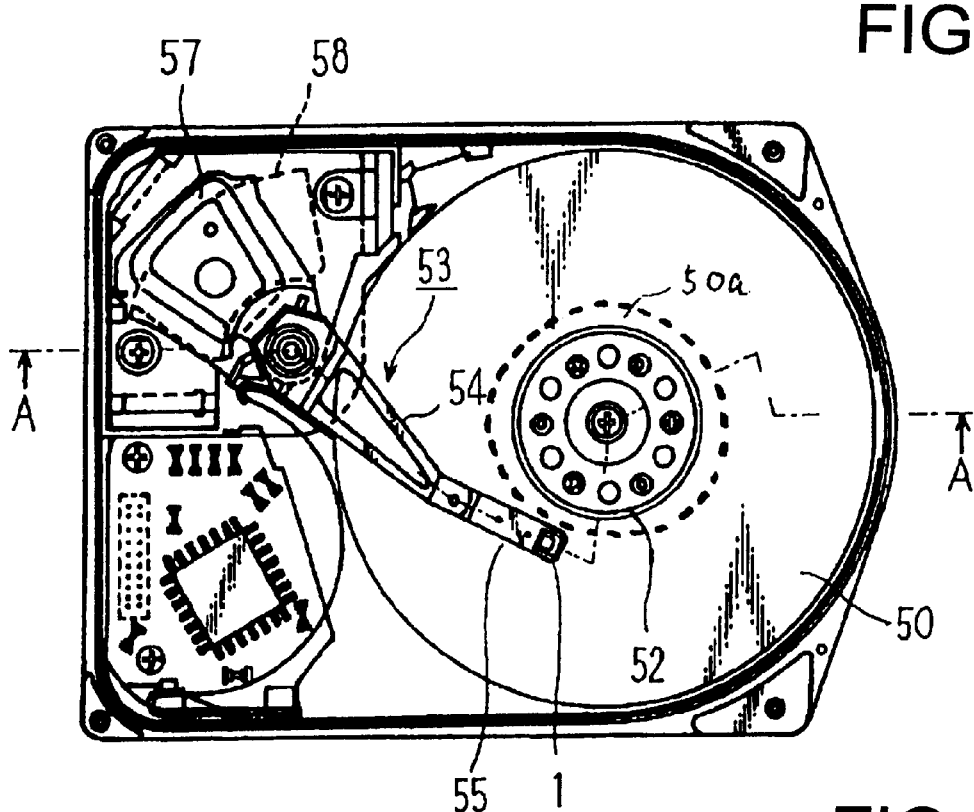
FIG. 2 is a plan view of a magnetic disk apparatus of the present invention.
Figure 3:
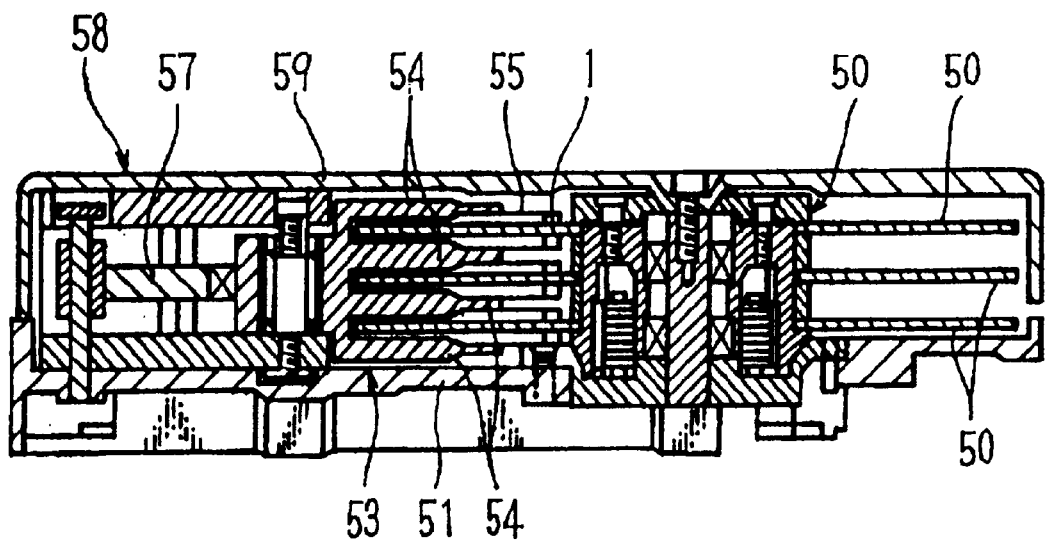
FIG. 3 is a cross-sectional view of the magnetic disk apparatus of FIG. 2, taken along the line A—A of FIG. 2.

FIG. 2 and FIG. 3 illustrate a magnetic disk in the preferred embodiment of the present invention. A magnetic disk 50 is driven by a spindle motor 52 provided on a base plate 51. In this embodiment, three magnetic disks are used.

An actuator 53 to support and drive the head slider is supported to rotate on the base plate 51. At one end of the actuator 53, a plurality of head arms 54 extending in the direction parallel to the recording surface of the magnetic disk 50 are formed. At one end of the head arm 54, a suspension 55 is mounted. A head slider 1 is mounted to a flexure of the suspension 55 by insulating film (not illustrated). At the other end of actuator 53, a coil 57 is mounted.

On the base plate 51, a magnetic circuit 58, formed of a permanent magnet and a yoke, is provided and the coil 57 is arranged within the magnetic gap of the magnetic circuit 58. With the magnetic coil 58 and coil 57, a voice coil motor (VCM) is formed. Moreover, the upper part of the base plate 51 is covered with a cover 59.

Operations of the magnetic disk apparatus will then be explained. When the magnetic disk 50 is not rotated, the head slider 1 stops in contact with a save zone (CSS zone) 50a of the magnetic disk 50. The position of the CSS zone 50a is not limited to the internal circumference of the disk 50 and may be located at the external circumference thereof. Next, when the magnetic disk 50 is rotated by the spindle motor 52, the head slider floats on the disk, keeping only a small distance therefrom due to the air flow generated by rotation of the magnetic disk 50. When a current flows into the coil 57 and the head slider is floating, a propulsive force is generated by the coil 57 to rotate the actuator 53. The head slider moves to a predetermined track of the magnetic disk 50 in order to perform the data reading or writing.

Figure 4A:
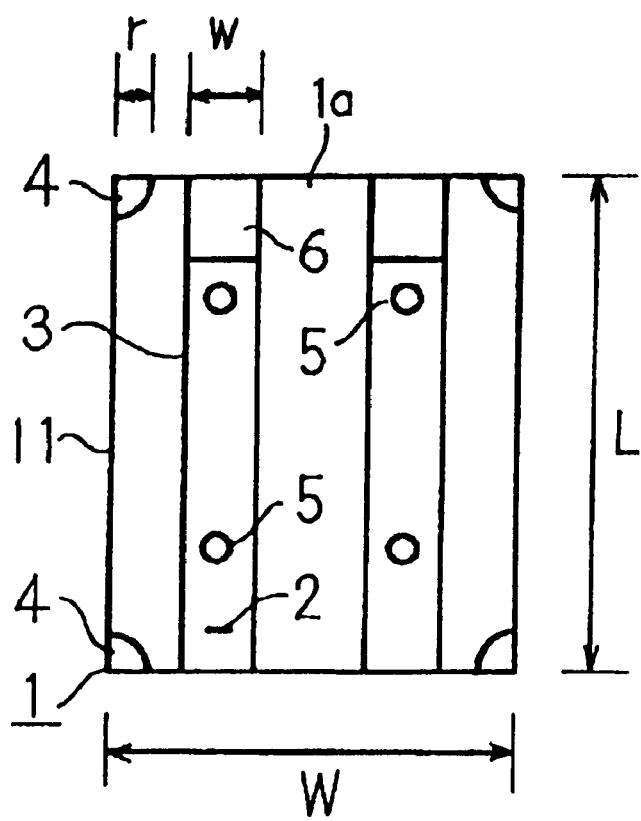
FIG. 4(a) is a plan view of the head slider of the first embodiment of the present invention.
Figure 4B:
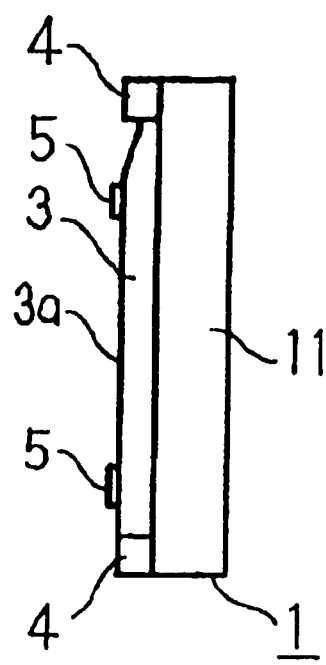
FIG. 4(b) is a side view of the head slider of the first embodiment of the present invention.
Figure 4C:
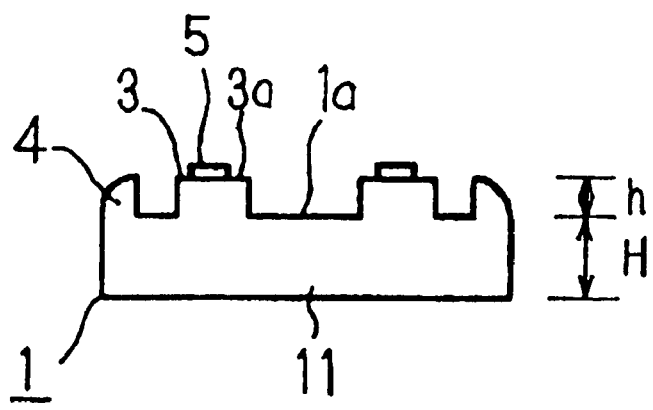
FIG. 4(c) shows an end surface of the air outgoing side of the first embodiment of the present invention.

FIG. 4 shows the head slider of the first embodiment mounted to the magnetic disk apparatus explained above. FIG. 4(a) shows the surface of the head slider opposing the disk, FIG. 4(b) shows the side surface, and FIG. 4(c) shows the end surface in the air outgoing side.

A base material 11 of the head slider in the first embodiment of the present invention is formed of a material such as aluminum titanium carbide ($Al_2O_3TiC$), ferrite or calcium titanate. The head slider has a length L of 0.6 to 1.3 mm, width W of 0.5 to 1.0 mm and height H of 0.1 to 0.4 mm. The head slider 1 is mounted on the magnetic disk apparatus to float from the surface of the rotating magnetic disk 50.

At a surface 1a of the basic material 11, a couple of stripe type rails 3 are projected to generate the predetermined floating force to the head slider 1. Height h of the rails 3 from the opposing surface 1a is preferably 30 $\mu$m or less and their width w is 0.5 mm or less.

At an air bearing surface 3a of the rails 3, an adsorption preventing pad 5 is formed. The adsorption preventing pad 5 reduces the contact area of the head slider 1 with the magnetic disk 50 and prevents contact of the air bearing surface 3a with the magnetic disk 50. A tapered portion 6 is formed at the air incoming end side of the air bearing surface 3a and this tapered portion 6 easily generates a floating force by the air flow.

At the end surface in the air outgoing side of the head slider 1, an electromagnetic transducer 2 (such as an inductive head, a magneto-resistive element and a spin valve magneto-resistive element) is formed.

At each corner of the basic material 11, a buffer pad 4 is formed. The surface of buffer pad 4 is chamfered in a certain radius and processed as a smoothly curving surface. Adequate radius r of the cross-section of the buffer pad 4 is ranged from 0.3 to 0.5 mm. Height of the buffer pad 4 from the opposing surface 1a is equal to the height of the rails 3.

In the magnetic disk apparatus employing the contact●start●stop system, when rotation of the magnetic disk 50 stops, the head slider 1 is in contact with the CSS zone of the magnetic disk 50. In general, a lubricating film having viscosity is formed as the upper most layer of the magnetic disk 50. When the contact area of the lubricating film and the head slider is wide, the head slider is attracted by the surface tension of the lubricating film and is adsorbed to the disk medium. Under this condition, a load of the spindle motor 52 to rotate the magnetic disk 50 becomes large and suspension 55 supporting the head slider deforms. However, in the head slider 1 of the present invention, an adsorption preventing pad 5 is formed at the air bearing surface 3a. As a result, the contact area with the magnetic disk 50 is reduced, and adsorption to the magnetic disk 50 of the head slider 1 is prevented.

Moreover, in the magnetic disk apparatus employing the contact●start●stop system, if it receives a shock when rotation of the magnetic disk stops, the head slider and magnetic disk surface contact each other. However, in the head slider 1 of the present invention, the buffer pad 4 is formed at the corner of the basic material 11 and the buffer pad 4 is in contact with the magnetic disk 50. Since the buffer pad 4 is covered at the surface with a curving surface as explained above, if the buffer pad 4 is in contact with the magnetic disk 50, wear of the magnetic disk 50 is eased. Although four buffer pads 4 are formed on the opposing surface 1a, it is enough when at least one buffer pad 4 exists.

The manufacturing process of the head slider 1 illustrated in FIG. 4 will be explained below.

Figure 5A:
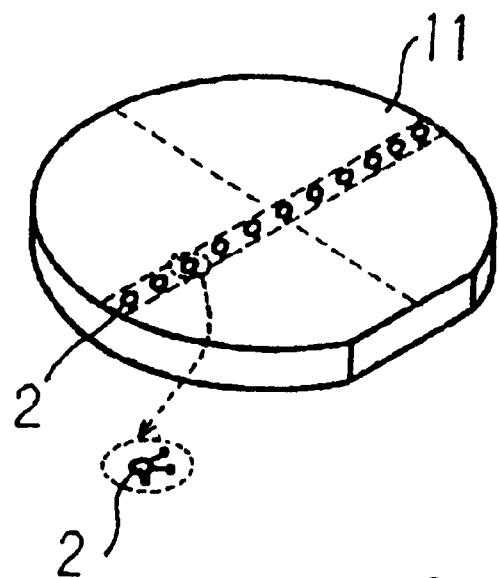
FIG. 5(a) shows the wafer on which a plurality of transducers is formed.

First, as illustrated in FIG. 5(a), a plurality of electro-magnetic conversion elements 2 are formed in two dimensions on the main surface of the wafer (basic material) 11 consisting of the materials such as aluminum titanium carbide ($Al_2O_3TiC$), ferrite or calcium titanate or the like. The electro-magnetic conversion element 2 is composed of a magneto-resistive element and an inductance element, etc. which are respectively connected to a couple of terminals. predetermined shape through the processes explained later.

Figure 5B:
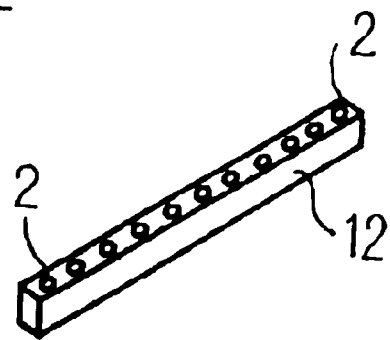
FIG. 5(b) shows a slider bar cut out from the wafer.

Next, the wafer 11 is divided by cutting it along the parallel broken lines of FIG. 5(a) with a dicing saw. With the dividing process, a plurality of rod type bodies 12 in which electro-magnetic conversion elements 2 are arranged in a line can be obtained, as illustrated in FIG. 5(b). Since the rod type bodies 12 are eventually divided into a plurality of bodies to become magnetic head sliders, the tapered portion 6 (FIG. 4(a)) is formed to the area which becomes the air incoming end of the air bearing surface 3a (FIG. 5(c)). The surface of the magnetic pole of the electro-magnetic conversion element 2 of the rod type body 12 becomes the disk confronting surface of the slider explained above.

Figure 5C:
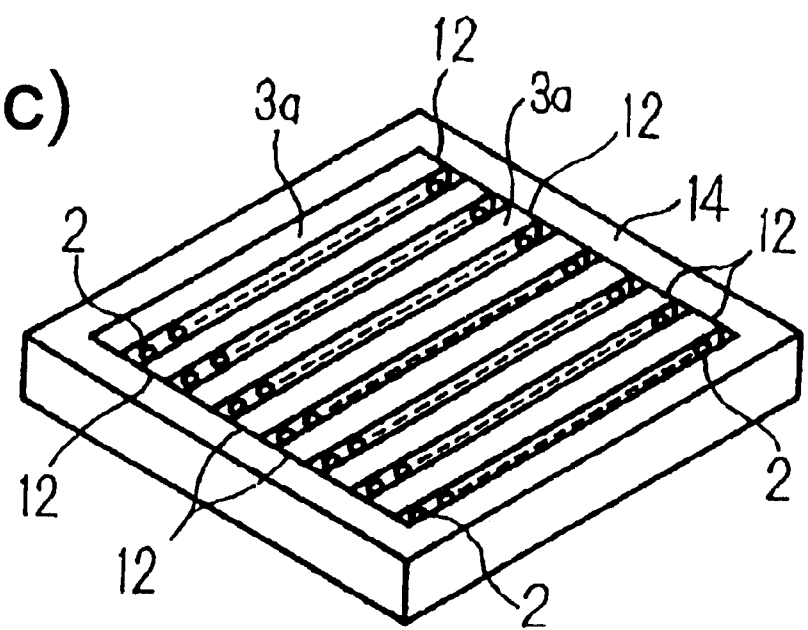
FIG. 5(c) shows the rod type body fixed in a holder.

Subsequently, as illustrated in FIG. 5(c), a plurality of rod type bodies 12 are fixed to a holder 14. The rod type bodies 12 are fixed to the holder 14 with the air bearing surface 3a placed upward and the cutting surfaces provided opposed with each other. The inside of the holder 4 has a structure to regulate free movement of the rod type body 12. The rode type body 12 fixed to the holder 14 is processed to the predetermined shape through the processes explained later.

FIGS. 6(a) to 6(h) illustrate the cutting surface of the rod type body 12. Using FIG. 6, the machining processes of the rod type body 12 in the first embodiment will be explained.

Figure 6A:
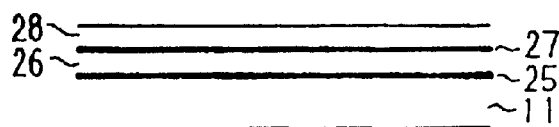
FIGS. 6(a)–6(h) show the manufacturing process of the head slider of the first embodiment of the present invention.

In FIG. 6(a), a SiC film 25 is formed in the thickness of 5 nm on the basic material 11 of rod type body 12, a first DLC film 26 consisting of diamond like carbon (DLC) is formed in the thickness of 30 nm on the SiC film 25, a SiC film 27 is formed in the thickness of 3 nm on the first DLC film 26 and a second DLC film 28 consisting of DLC is formed in the thickness of 30 nm on the SiC film 27.

The SiC film 25 insulates the electro-magnetic conversion element 2 and also enhances the close contact property (i.e, adhesion) between the first DLC film 26 and base material 11. The Si film 27 enhances the close contact property between the first DLC film 26 and the second DLC film 28.

The first DLC film 26 protects the air bearing surface 3a and electro-magnetic conversion element 2. The second DLC film 28 is processed and becomes the adsorption preventing pad 5. These films can be formed by film forming techniques such as the sputtering method, CVD method and evaporation or the like.

Figure 6B:
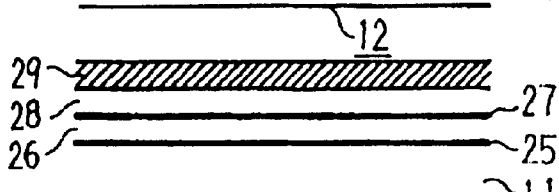

In FIG. 6(b), a first film resist 29 is stacked on the second DLC film 28 using a laminator.

Figure 6C:
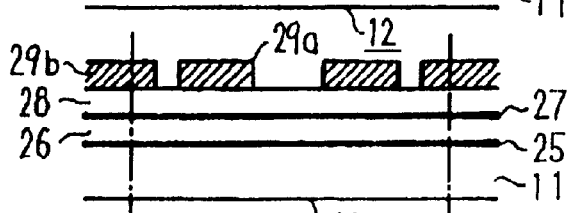

In FIG. 6(c), the first resist 29 is covered with a mask pattern for the purpose of exposing and development. As a result, the resist 29 is left only on particular areas 29a, 29b of the second DLC film 28.

Figure 6D:
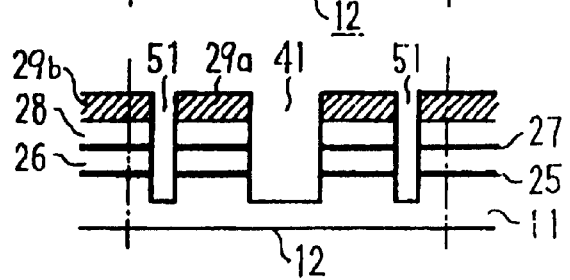
Figure 6E:
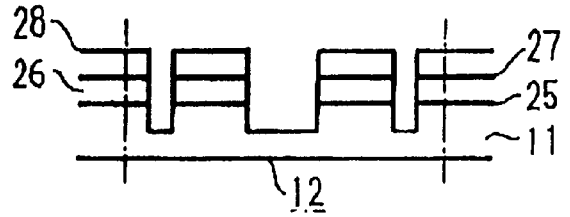
Figure 6F:
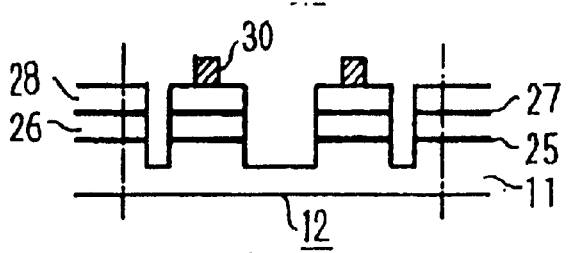
Figure 6G:
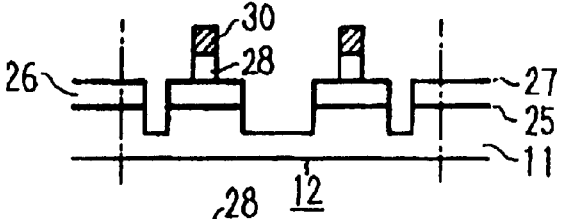
Figure 6H:
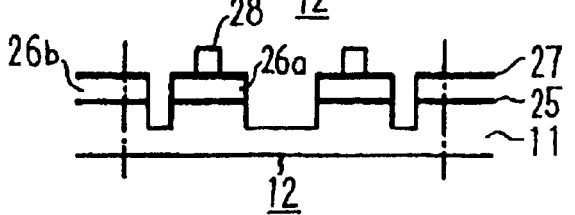
Figure 7A:
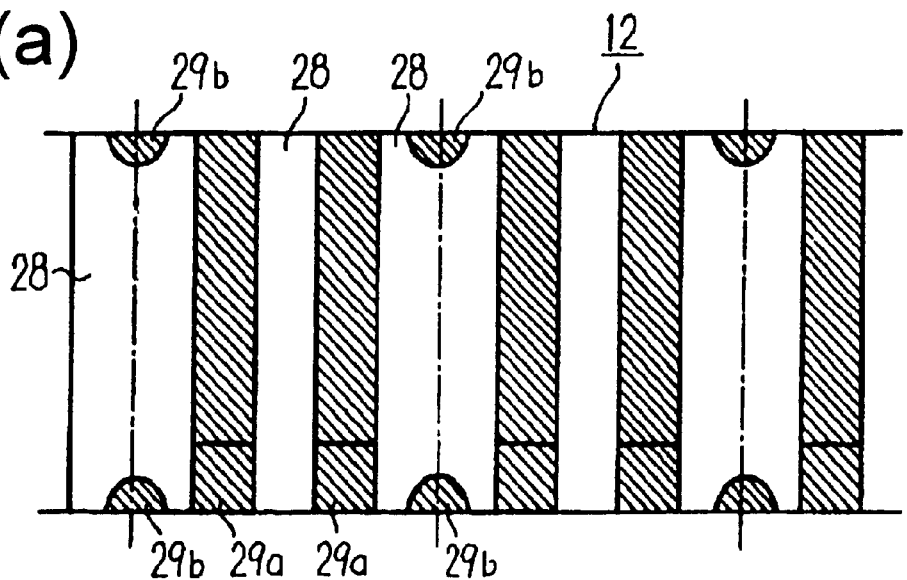
FIG. 7(a) is a plan view of the rod type body in the condition shown in FIG. 6(c)

FIG. 7 is a plan view of the disk confronting surface side of the rod type body. FIG. 7(a) shows the rod type body in the condition illustrated in FIG. 6(c). The broken lines in FIG. 6 and FIG. 7 are the cutting lines for dividing the rod type body 12 into individual head sliders.

Figure 7B:
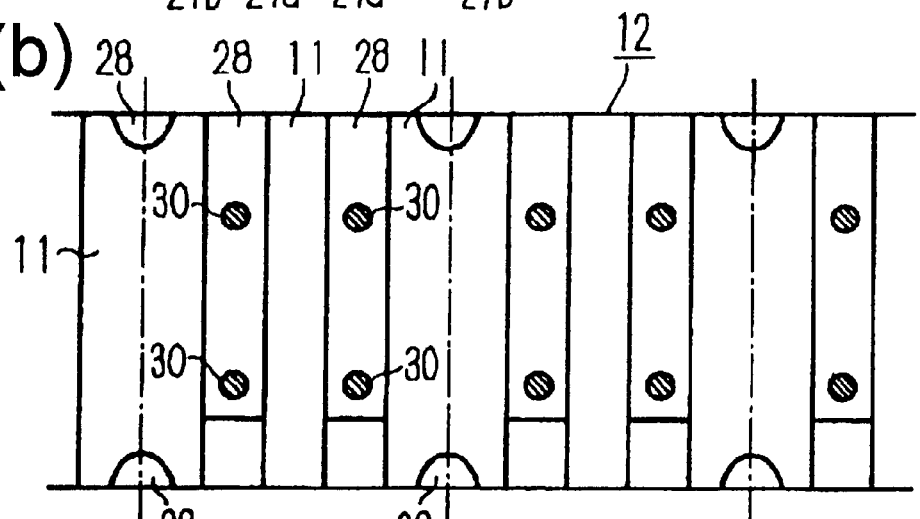
FIG. 7(b) is a plan view of the rod type body in the condition shown in FIG. 6(f)
Figure 7C:
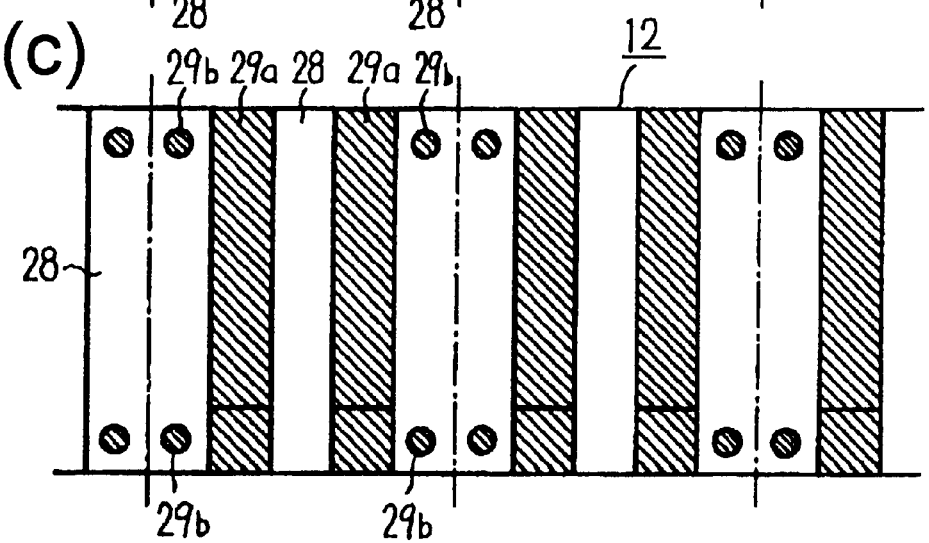
FIG. 7(c) is a plan view of the rod type body on which a resist pattern is formed in the second embodiment of the present invention.

In FIG. 7(a), the hatched area is the area where the first film resist 29 is placed. In the other area, the second DLC film 28 is exposed. As illustrated in FIG. 7(a), the first film resist 29 is classified into the film resist 29a having the stripe pattern and the film resist 29b having a semi-circular pattern. The former regulates the shape of the air bearing surface 3a, while the latter the shape of buffer pad 4. In FIG. 7(a) and FIG. 7(b), the resist 29b rides over the cutting line but it is also possible to perform the patterning to remove the resist 29 on the cutting line, as in FIG. 7(c). Thereby, the layer on the cutting line is removed by subsequent ion milling and cutting which may be done easily in the unit of head slider.

In FIG. 6(d), ion milling is performed on the rod type body 12. With the ion milling, the rod type body 12 allows the area not covered with the first resist 29 to be removed up to the upper layer of the basic material 11. As a result of ion milling, a recess 41 is formed on the rod type body 12 to identify a couple of rails, and a groove 51 is formed to divide the pad and slider rail.

In FIG. 6(e), the resist 29 can be removed.

In FIG. 6(f), the second film resist 30 is stacked on the second DLC film 28 and the second resist 30 is left only on the surface where the adsorption preventing pad 5 is to be formed, through masking, exposing and development.

FIG. 7(b) is a plan view of the disk confronting surface side of the rod type body 12 placed in the condition of FIG. 6(f).

In FIG. 7(b), the hatched area indicates the second resist 30. The second resist 30 regulates the shape of the surface of the adsorption preventing pad 5 to be formed on the air bearing surface 3a.

In FIG. 6(g), the rod type body 12 illustrated in FIG. 6(f) is etched by oxygen plasma. As a result, the second DLC film 28 is selectively etched, leaving the area covered with the second resist 30. The DLC film 28 which is left becomes the adsorption preventing pad 5. The etching rate for the Si film 27 by such oxygen plasma is extremely small or zero and the Si film 27 functions as the etching stopper. Therefore, it is not required to control the etching time as precisely as in ion milling, and fluctuation in the amount of etching among a plurality of rod type bodies can be controlled.

In FIG. 6(h), the second film resist 30 is removed and the exposed Si film 27 is removed by $CF_4$ plasma etching. In the $CF_4$ plasma etching, since the remaining DLC film is not removed, the etching depth of the Si film 27 can be controlled easily. In the figure, the area indicated by the reference numeral 26a on the first DLC film 26 becomes the rail 3 and the area indicated by 26b becomes the buffer pad 4.

The rod type body 12 shaped to the predetermined shape is removed from the holder 14. The rod type body 12 is subjected to the polishing process by a polishing apparatus for the purpose of chamfering the DLC film 26b.

Figure 8:
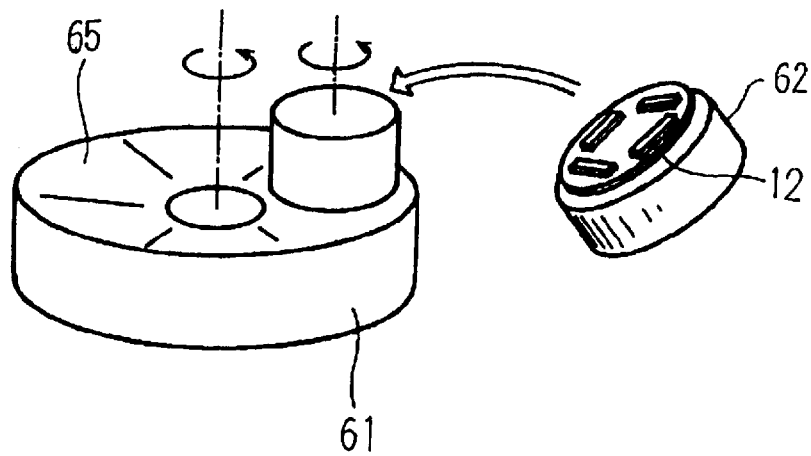
FIG. 8 shows a polishing apparatus.

FIG. 8 is an external appearance of the polishing apparatus.

As illustrated in FIG. 8, the polishing apparatus includes a surface plate 61 and a weight 62. The polishing surface 65 of the surface plate 61 has a certain curvature and rotates around the rotating shaft. The weight 62 holds the rod type body 12 at the surface opposed to the polishing surface 65 and presses this rod type body 12 to the surface of the surface plate 61 and also rotates by itself on the polishing surface 65.

FIG. 9 is a cross-sectional view of the surface plate 61 along the line passing the center of the surface plate 61.

Figure 9A:
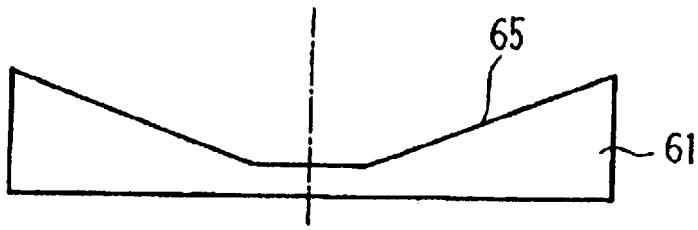
FIG. 9(a) is cross-sectional view of a surface plate having a conic shaped polishing surface.
Figure 9B:
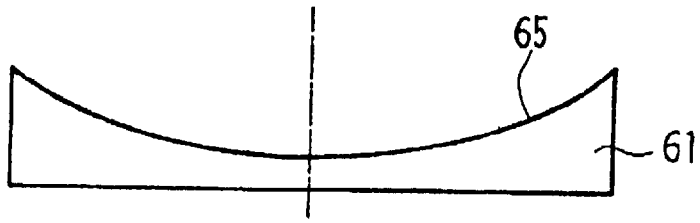
FIG. 9(b) is a cross-sectional view of a surface plate having a curved polishing surface.
Figure 9C:
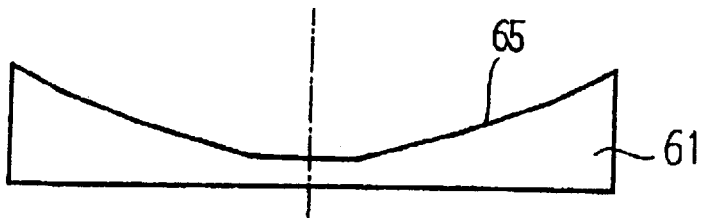
FIG. 9(c) is cross-sectional view of a surface plate having a conic shaped polishing surface in which the radius of curvature is different in the inner circumference and outer circumference.
Figure 9D:
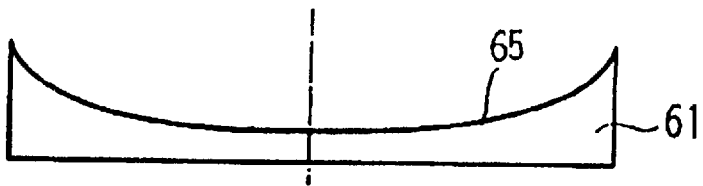
FIG. 9(d) is a cross-sectional view of a surface plate having a curved polishing surface in of which the radius of curvature is different in the inner circumference and outer circumference.

The polishing surface 65 of the surface plate 61 may be a conic surface as illustrated in FIG. 9(a) or the curving surface as illustrated in FIG. 9(b). Moreover, in regard to the polishing surface 65, the radius of curvature may be different in the inner circumference and outer circumference as illustrated in FIG. 9(c) and FIG. 9(d). In general, it is easier to form the conic surface rather than to form the curving surface and the surface plate having the shape of polishing surface as illustrated in FIG. 9(a) and FIG. 9(c).

FIG. 10 shows the polishing process for the rod type body 12.

Figure 10A:
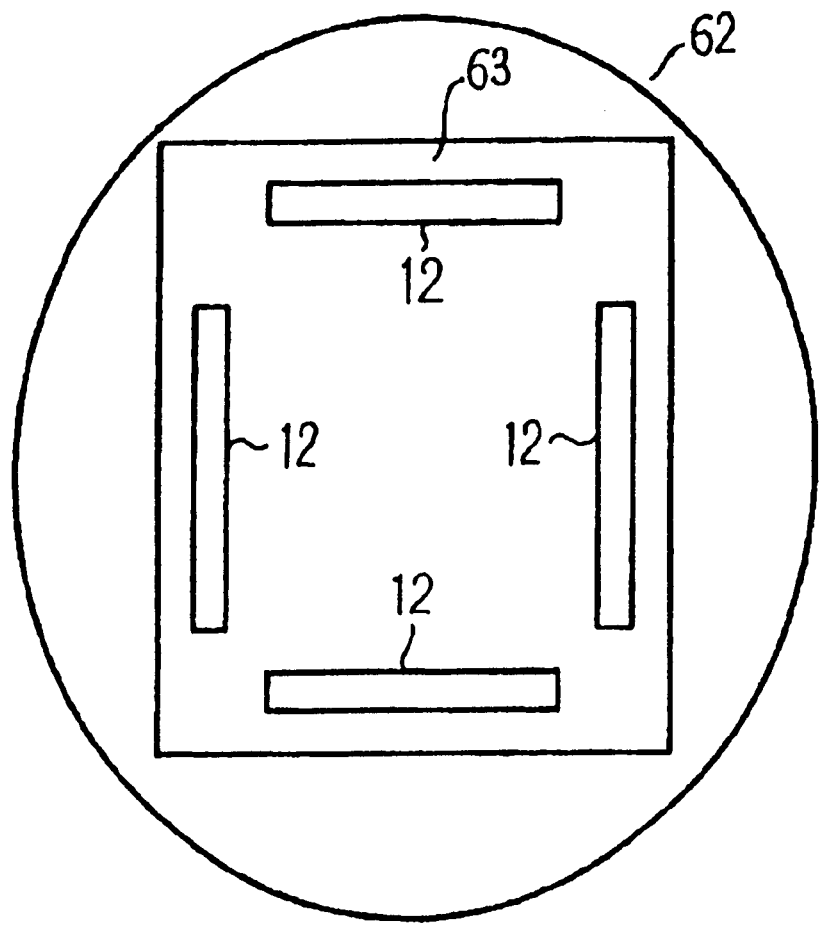
FIG. 10(a) shows rod type bodies arranged on the surface of the weight.

As illustrated in FIG. 10(a), an elastic material sheet (rubber plate 63) is adhered to the surface of the weight 62 opposing the polishing surface 65. On the rubber plate 63, a rod type body 12 is adhered. The rod type body 12 is arranged in its longitudinal direction along the circumference direction of the weight 62.

Figure 10B:
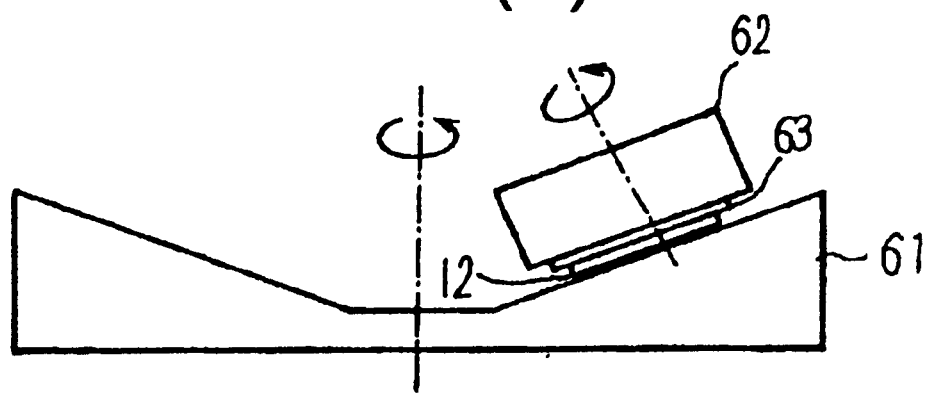
FIG. 10(b) shows the rotating surface plate and weight.

The rod type body 12 attached to the weight 62 is pushed to the polishing surface 65 of the surface plate 61 as illustrated in FIG. 10(b). The surface plate 61 and weight 62 rotate around the rotating shaft to polish the rod type body 12. Since the rod type body 12 is rotated on the polishing surface 65 having a curvature, this curvature is transferred to the surface to be polished (surface opposing to the disk) of the rod type body. As a result, the edge of DLC film 26b formed on the basic material 11 of the rod type body 12 is removed to form a curving surface.

Although the adsorption preventing pad 5 is formed on the head slider illustrated in FIG. 4, this pad is not always required in the present invention. The adsorption pad of the head slider 1 illustrated in FIG. 4 can be omitted by omitting the formation of the Si film 27 and DLC film 28 in the process illustrated in FIG. 6(a) and then selectively etching the first DLC film 26 with ion milling or oxygen plasma using the resist pattern illustrated in FIG. 7(a).

Figure 11A:
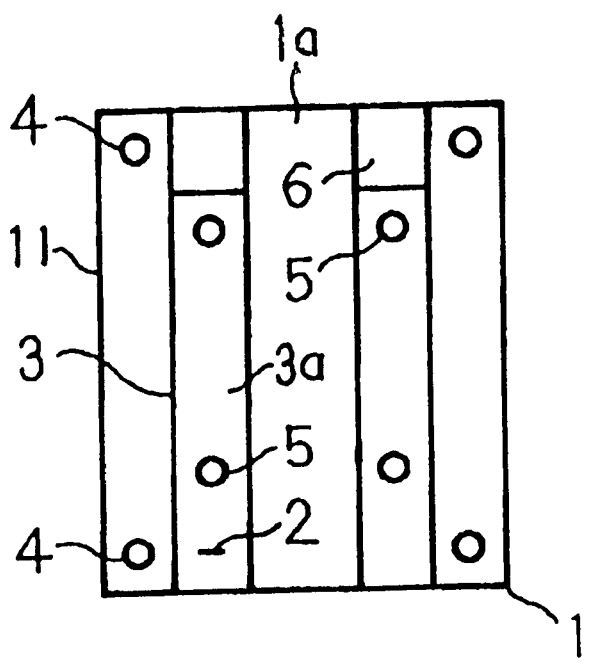
FIG. 11(a) is a plan view of the head slider of the second embodiment of the present invention.
Figure 11B:
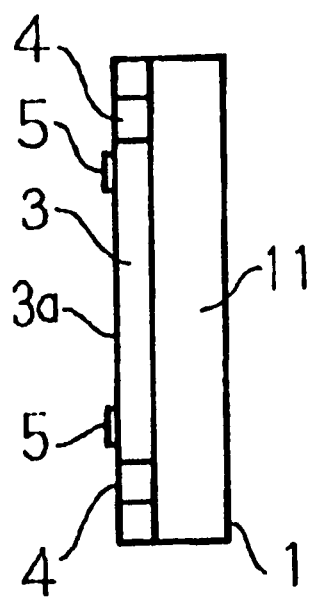
FIG. 11(b) is a side view of the head slider of the second embodiment of the present invention.
Figure 11C:
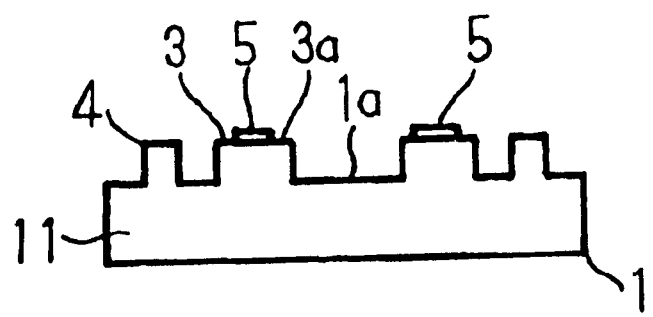
FIG. 11(c) shows an end surface of the air outgoing side of the head slider of the second embodiment of the present invention.

FIG. 11 shows the head slider of the second embodiment of the present invention.

The head slider illustrated in FIG. 4 allows the buffer pad 4 to be formed on the corner of the basic material 11 but the buffer pad 4 is formed at the position isolated from the corner in the head slider of the second embodiment. The height of the buffer pad is preferably equal to that of the rail.

The manufacturing process of the head slider of the second embodiment is almost identical to that of the first embodiment. The difference is that the first film resist 29 is formed in the pattern illustrated in FIG. 7(c) in the process (patterning of the first film resist 29) illustrated in FIG. 6(c). Moreover, even in the head slider in the second embodiment, the adsorption preventing pad 5 can be omitted by omitting the Si film 27 and second DLC film 28 in the process illustrated in FIG. 6(a).

The buffer pad 4 of the head slider in the second embodiment illustrated in FIG. 11 is formed as a column but it may be an elliptical pillar or a square pillar. Particularly, since the column and elliptical pillar have the curved edge and therefore it assures a certain shock resistance even when the chamfering is not carried out.

In the head slider in the first and second embodiments, the height of the slider rail 3 is equal to the height of the buffer pad 4 but the height of the buffer pad 4 may be lower than the slider rail 3. The manufacturing method of the head slider having the structure explained above will be explained using FIG. 12. The process up to fixing the rod type body 12 cut out from the wafer to the holder 14 and the polishing process for the rod type body are common to the embodiments explained previously.

In FIG. 12(a), the SiC film 25 in the thickness of 5 nm, first DLC film 26 in the thickness of 30 nm, SiC film 27 in the thickness of 3 nm, second DLC film 28 in the thickness of 30 nm, second SiC film 29 in the thickness of 3 nm and third DLC film 30 in the thickness of 30 nm are sequentially laminated on the basic material 11 of the rod type body 12.

In FIG. 12(b), a film resist 31 is formed on the third DLC film 30 and the film resist 31 is processed to the predetermined pattern through the masking, exposing and developing processes.

In FIG. 12(c), the rod type body 12 is etched by the ion milling up to the depth of the upper layer part of the basic material 11.

In FIG. 12(d), the film resist 31 is removed and the film resist 32 is formed at the surface of rod type body 12. Moreover, the resist 32 is left only at the area in which the rail is to be formed through the masking, exposing and developing processes.

In FIG. 12(e), the third DLC film 30 on the area where the buffer pad is to be formed is removed by the oxygen plasma etching.

In FIG. 12(f), the second Si film 29 exposed at the surface is removed by the $CF_4$ etching process.

In FIG. 12(g), the resist 32 is removed and the film resist 33 is formed at the surface of rod type body 12. Moreover, the film 33 is left only at the surface where the adsorption preventing pad is to be formed through the masking, exposing and developing processes.

In FIG. 12(h), the exposed DLC film 28 and DLC film 30 are removed by oxygen plasma etching.

In FIG. 12(i), the resist 33 is removed and moreover exposed Si films 27 and 29 are removed by $CF_4$ etching.

In the head slider of the embodiments explained above, the rail 3 and buffer pad 4 are formed of the same material but these may also be formed of different materials.

The process for manufacturing heads including the rail 2 and buffer pad 4 formed of different materials will be explained.

Figure 13A:
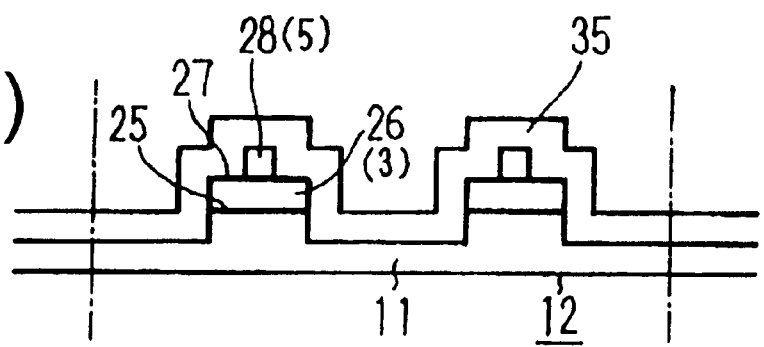
FIGS. 13(a)–13(e) show steps in the manufacturing process of the head slider including the rail and buffer pad consisting of different materials.

In FIG. 13(a), a pad layer 35 which becomes a material of buffer pad 4 is formed to the rod type body 12 on which the rail 3 and adsorption preventing pad 28 are already formed. As the material of pad 4, C, Si, SiC and $SiO_2$ may be listed and any suitable method is selected as the film forming method from the sputtering method, CVD method and evaporation method. For the process up to formation of the rail and adsorption preventing pad, various methods used can be utilized.

Figure 13B:
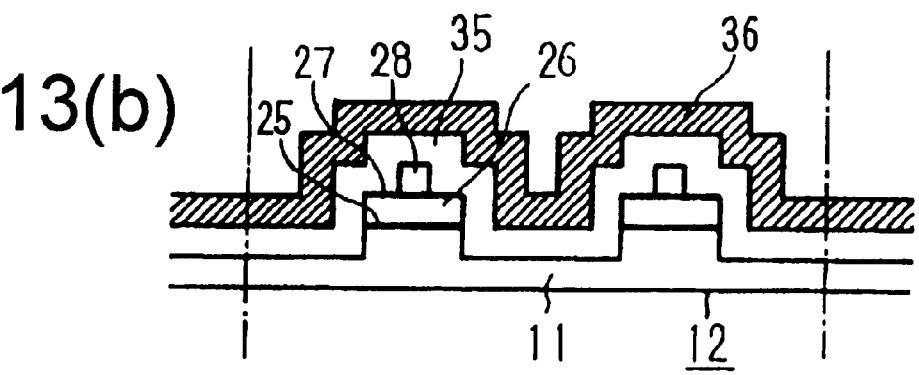

In FIG. 13(b), a resist 36 is formed on the pad layer 35.

Figure 13C:
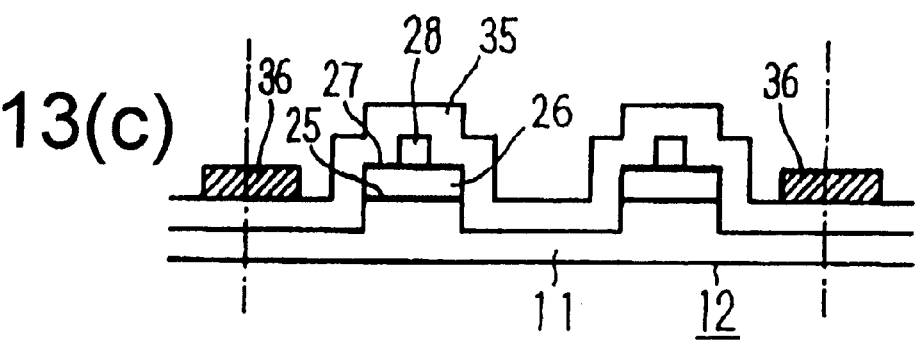

In FIG. 13(c), the resist 36 is patterned and it is left only at the surface where the buffer pad is to be formed through the exposing and developing process.

Figure 13D:
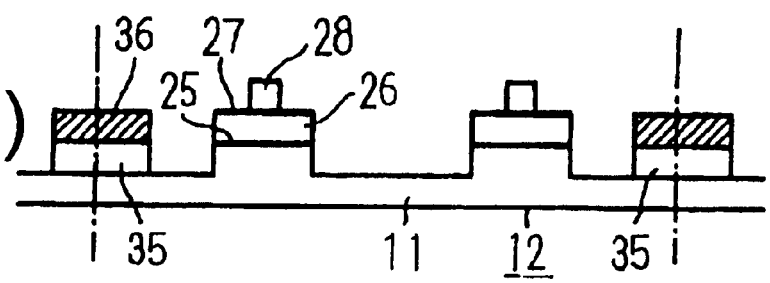

In FIG. 13(d), the pad layer 35 not covered with the resist 36 is removed by ion milling or plasma etching. Particularly, when the pad layer 35 is formed of material such as Si and SiC, it is preferable to use $CF_4$ plasma etching from the point of view of easiness in management of the etching depth.

Figure 13E:
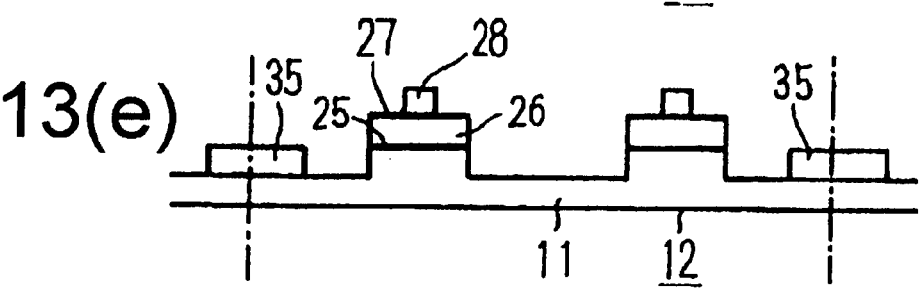

In FIG. 13(e), the resist 36 is removed. Moreover, the exposed Si film 27 is removed by $CF_4$ etching. When $CF_4$ plasma etching is used in the step illustrated in FIG. 13(d), it is also effective for removal of the Si film 27 and therefore such etching is not required here. Or, the Si film 27 may be removed before formation of the buffer pad.

As explained above, the head slider of the present invention is characterized in that the pad is formed at the side edge of the surface opposing the disk. When the disk apparatus loading the head slider of the present invention receives a shock, the disk is in contact with the pad and contact between the disk and a sharp angle of the head slider may be avoided. Namely, wear of the disk and head slider can be alleviated through loading of the head slider of the present invention. As a result, shock resistance of the disk apparatus can be improved and high reliability can also be assured.

While the principles of the invention have been described above in connection with specific apparatus and applications, it is to be understood that this description is made only by way of example and not as a limitation on the scope of the invention.

What is claimed is:

1. A head slider in which a head element for writing or reading data to or from a disk is formed on a slider body having a side edge extending in a longitudinal direction of the head slider, comprising:
    a slider rail which is configured to project from a disk opposing surface of said slider body towards the disk, said slider rail extending in the longitudinal direction of said slider body and being spaced from the side edge; and
    a chamfered pad which projects from said disk opposing surface within an area between the side edge and said slider rail, wherein said chamfered pad is chamfered via a smooth curving surface that extends for substantially the full height of said chamfered pad, wherein said height is defined between said disk opposing surface and a distal end of said chamfered pad.

2. The head slider as claimed in claim 1, wherein a height of said pad is less than that of said slider rail.

3. The head slider as claimed in claim 2, wherein a hardness of said pad is lower than that of a remainder of said slider body.

4. The head slider as claimed in claim 1, wherein said pad and said slider rail have the same height.

5. The head slider as claimed in claim 4, wherein said pad and said slider are formed of the same material.

6. The head slider as claimed in claim 1, wherein said smooth curving surface of said chamfered pad has a radius of curvature that is much greater than the height of said chamfered pad.

7. The head slider as claimed in claim 6, wherein said radius of curvature of said chamfered pad is between approximately 0.3 and 0.5 mm, and said height of said chamfered pad is less than approximately 0.03 mm.

8. A head slider in which a head element for writing or reading data to or from a disk medium is formed on a slider body having a side edge extending in a longitudinal direction of the head slider, comprising:
    a slider rail which is projected from a disk opposing surface of said slider body, said slider rail extending in the longitudinal direction of said slider body spaced from the side edge;
    a chamfered pad which projects from said disk opposing surface in a height equal to or less than the height of said slider rail, said chamfered pad being completely located in an area between the side edge and said slider rail at the surface opposed to said disk, wherein said chamfered pad is chamfered via a smooth curving surface that extends for substantially the full height of said chamfered pad, wherein said height is defined between said disk opposing surface and a distal end of said chamfered pad; and
    at least one adsorption preventing pad formed on said slider rail.

9. The head slider as claimed in claim 8, wherein said pad has a hardness lower than that of a remainder of said slider body.

10. The head slider as claimed in claim 8, wherein said pad is equal in the height to said head slider.

11. The head slider as claimed in claim 10, wherein said pad is formed of a material which is the same as that of said head slider.

12. The head slider as claimed in claim 8, wherein said smooth curving surface of said chamfered pad has a radius of curvature that is much greater than the height of said chamfered pad.

13. The head slider as claimed in claim 12, wherein said radius of curvature of said chamfered pad is between approximately 0.3 and 0.5 mm, and said height of said chamfered pad is less than approximately 0.03 mm.

14. A disk drive device comprising:
    a disk medium;
    a spindle motor rotating said disk medium;
    a head slider having a head element for writing or reading data to or from a disk, said head slider being formed of a slider body, and
    a slider rail that is configured to project from a disk opposing surface of said slider body towards the disk and that extends in a longitudinal direction of said slider body;
    wherein said head slider further includes a chamfered pad that projects from said disk opposing surface within an area between a side edge of said slider body and said slider rail; and
    further wherein said chamfered pad is chamfered via a smooth curving surface that extends for substantially the full height of said chamfered pad, wherein said height is defined between said disk opposing surface and a distal end of said chamfered pad.

15. The disk drive as claimed in claim 14, wherein said smooth curving surface of said chamfered pad has a radius of curvature that is much greater than the height of said chamfered pad.

16. The head slider as claimed in claim 15, wherein said radius of curvature of said chamfered pad is between approximately 0.3 and 0.5 mm, and said height of said chamfered pad is less than approximately 0.03 mm.

17. A disk drive device comprising:
    a disk medium;
    a spindle motor rotating said disk medium;
    a head slider in which a head element for writing or reading data to or from said disk medium is formed on a slider body, a slider rail that projects from a disk opposing surface of said slider body and that extends in a longitudinal direction of said slider body;

a chamfered pad which projects from said disk opposing surface, to a height less than a height of said slider rail, said chamfered pad being completely located an area between a side edge and said slider rail, wherein said chamfered pad is chamfered via a smooth curving surface that extends for substantially the full height of said chamfered pad, wherein said height is defined between said disk opposing surface and a distal end of said chamfered pad; and at least one adsorption preventing pad formed on said slider rail.

18. The disk drive as claimed in claim 17, wherein said smooth curving surface of said chamfered pad has a radius of curvature that is much greater than the height of said chamfered pad.

19. The disk drive as claimed in claim 18, wherein said radius of curvature of said chamfered pad is between approximately 0.3 and 0.5 mm, and said height of said chamfered pad is less than approximately 0.03 mm.

* * * * *